(12) United States Patent
Kim et al.

(10) Patent No.: US 11,008,837 B2
(45) Date of Patent: May 18, 2021

(54) MODELING METHOD FOR GAS PRODUCTION OF CBM RESERVOIR ROCKS

(71) Applicant: Korea Gas Corporation, Daegu (KR)

(72) Inventors: Kihong Kim, Ansan-si (KR); Jeong-Min Han, Ansan-si (KR); Youngseok So, Ansan-si (KR); Il oh Kang, Ansan-si (KR); Junwoo Seo, Ansan-si (KR)

(73) Assignee: KOREA GAS CORPORATION, Daegu (KR)

( * ) Notice: Subject to any disclaimer, the term of this patent is extended or adjusted under 35 U.S.C. 154(b) by 340 days.

(21) Appl. No.: 15/947,968

(22) Filed: Apr. 9, 2018

(65) Prior Publication Data
US 2018/0306009 A1   Oct. 25, 2018

(30) Foreign Application Priority Data
Apr. 20, 2017 (KR) ........................ 10-2017-0050909

(51) Int. Cl.
| | |
|---|---|
| *E21B 43/00* | (2006.01) |
| *G06F 30/23* | (2020.01) |
| *G06F 111/10* | (2020.01) |
| *G01V 11/00* | (2006.01) |
| *E21B 49/02* | (2006.01) |

(52) U.S. Cl.
CPC ............ *E21B 43/006* (2013.01); *G01V 11/00* (2013.01); *G06F 30/23* (2020.01); *E21B 49/025* (2013.01); *E21B 2200/20* (2020.05); *G06F 2111/10* (2020.01)

(58) Field of Classification Search
CPC ...... E21B 43/006; E21B 49/025; G06F 30/23; G06F 2111/10; G01V 11/00
See application file for complete search history.

(56) References Cited

U.S. PATENT DOCUMENTS

| | | | |
|---|---|---|---|
| 5,501,273 A * | 3/1996 | Puri ...................... | E21B 43/006 166/245 |
| 6,860,147 B2 * | 3/2005 | Gunter .................. | E21B 43/006 73/152.05 |

(Continued)

OTHER PUBLICATIONS

Ryba, A., et al. "Methodologies and Tools for Coalbed Methane (CBM) Field Development Planning Studies" Society Petroleum Engineers, SPE 146545 (2011) (Year: 2011).*

(Continued)

*Primary Examiner* — Jay Hann
(74) *Attorney, Agent, or Firm* — Hauptman Ham, LLP

(57) ABSTRACT

A method for modeling gas production in a coalbed methane gas (CBM) reservoir including (a) dividing a reservoir in a CBM development area into three-dimensional grids to form the three-dimensional grids having a plurality of cells; (b) forming at least one drilling hole in the development area and obtaining a sample for each depth in the reservoir; (c) modeling the amounts of ash, water, and gas for the plurality of cells in the three-dimensional grids; (d) modeling a pressure change over time in each of the cells in the grid under a premise in which a production well is formed in the grids; and (e) performing a Langmuir experiment for a core sample obtained from step (b).

10 Claims, 17 Drawing Sheets

(56) References Cited

U.S. PATENT DOCUMENTS

| | | | | |
|---|---|---|---|---|
| 7,216,702 | B2* | 5/2007 | Carlson | E21B 43/006 166/250.01 |
| 8,640,771 | B2* | 2/2014 | Pope | E21B 43/006 166/250.01 |
| 8,760,657 | B2* | 6/2014 | Pope | E21B 49/08 356/437 |
| 2010/0250215 | A1* | 9/2010 | Kennon | G06F 30/23 703/10 |

OTHER PUBLICATIONS

Arrey, E. "Impact of Langmuir isotherm on production behavior of CBM reservoirs" Dissertation, West Virginia U. (2004) available from <https://researchrepository.wvu.edu/etd/1523>. (Year: 2004).*

Chen, K., et al. "Preliminary Study on Gas Storage Capacity and Gas-in-Place for CBM Potential in Balingian Coalfield, Sarawak Malaysia" IEEE (2011) (Year: 2011).*

Hao, S., et al. "Effect of the Surface Oxygen Groups on Methane Adsorption on Coals" Applied Surface Science, vol. 264, pp. 433-442 (2013) (Year: 2013).*

Aminian, K. & Ameri, S. "Predicting Production Performance of CBM Reservoirs" J. Natural Gas Science & Engineering, vol. 1, pp. 25-30 (2009) (Year: 2009).*

Mavor, M.J., et al. "Measurement and Evaluation of Coal Sorption Isotherm Data" Society of Petroleum Engineers, SPE-20728-MS (1990) (Year: 1990).*

* cited by examiner

MODELING METHOD FOR GAS PRODUCTION OF CBM RESERVOIR ROCKS

CROSS REFERENCE TO RELATED APPLICATION

This application claims priority to and the benefit of Korean Patent Application No. 10-2017-0050909 filed in the Korean Intellectual Property Office on Apr. 20, 2017, the entire contents of which are incorporated herein by reference.

TECHNICAL FIELD

The present invention relates to a technique in the field of energy and resources, and particularly, to a modeling method for the gas production in the coalbed methane reservoir.

BACKGROUND ART

The paradigm of global energy resource is being shifted from present traditional energy resources to non-traditional energy resources. In particular, the nontraditional energy resources (UG) are being evaluated as next generation energy sources replacing the existing coal or petroleum. Representative nontraditional gas energy resources include shale gas, tight gas, and coalbed methane (CBM).

The CBM is comparatively easy to develop compared with the shale gas. The shale gas is present underground between 2,000-3,000 m, but the CBM is present at a shallower place than that of the shale gas. Accordingly, the development of CBM is easier than that of the shale gas, but the CBM is characterized by having rather richer reserves.

During the past 20 years, the CBM emerges as one of important energy sources. The CBM has no toxicity and does not discharge ash, and also discharges a smaller amount of $CO_2$ than coal, petroleum, or woods. Due to such advantages of the CBM, the CBM is spotlighted as a countermeasure against the increase of energy demand.

FIG. 1 is a view for illustrating a production structure of CBM, and FIG. 2 is a view for illustrating a gas adsorption structure of CBM.

Referring to FIGS. 1 and 2, methane gas is adsorbed on coal acting as a matrix in a coal layer, that is, a reservoir. Water is filled in fine cracks between the matrices, and a portion of methane gas is present as a free gas. That is, most of methane gas is adsorbed on the coal. When a production well is drilled from the ground to the reservoir, the methane gas adsorbed on the coal is detached due to a decrease in the pressure applied to the reservoir. The detached methane gas moves along the cracks of the coal layer and is discharged through the production well.

As described above, most of the methane gas is present with adsorbed only on the coal. In addition, in the reservoir in which coal is reserved, water and ash (general rocks) coexist with the coal (including volatile materials).

Accordingly, in order to precisely evaluate the content of methane gas in a CBM reservoir, it is important to precisely determine the contents of coal, ash, and water. In addition, the contents of coal, ash, and water are also important to determine the trend of gas production.

It is an issue that the traditional gas and the nontraditional gas have very different reservation characteristics. That is, the traditional gas is intensively present in an area in which a special topographic structure (reservoir rock, covering rock, anticline structures, etc.) is prominent, but the CBM is widely distributed along a coal layer. In addition, the density of methane gas per unit volume is very lower than those of the traditional gases. Accordingly, compared to the traditional gas, the reservoir in which methane gas is present is characterized in that sedimentary facies are much diversified and non-uniformly appear. In other words, the CBM has non-uniform contents of ash, water, and coal for each region even in the same reservoir. Accordingly, when a resource amount evaluation modeling method and a production modeling method which are used for the development of the traditional gas are applied as it is, precise analysis is impossible.

However, active researches on the untraditional gas have not been performed in Korea. The biggest reason of this is because there is no reasonable area for the development of the CBM and thus, there is no test bed for the research. Thus, Korea significantly lacks research and technology regarding the development of CBM.

DISCLOSURE OF THE INVENTION

Technical Problem

The present invention has been devised for solving the above limitations, and is to provide a modeling method for gas production in a coalbed methane gas reservoir in which the productivity of methane gas in the reservoir can be precisely predicted.

Meanwhile, other unspecified purposes of the present invention will be further considered within a scope which can be easily inferred from the detailed descriptions below and the effects thereof

Technical Solution

A modeling method for gas production in a coalbed methane reservoir according to the present invention for achieving the above problem is characterized by including:
(a) dividing a reservoir in a coalbed methane gas (CBM) development area into three-dimensional grids to form the three-dimensional grids having a plurality of cells;
(b) forming at least one drilling hole in the development area and obtaining a sample for each depth in the reservoir;
(c) modeling the amounts of ash, water, and gas for the plurality of cells in the three-dimensional grids;
(d) modeling a pressure change over time in each of the cells in the grid under a premise in which a production well is formed in the grids;
(e) performing a Langmuir experiment for a core sample obtained from step (b), calculating a Langmuir volume correction constant and a pressure correction constant for a case in which ash and water are excluded and only coal is present in the core sample, determining a Langmuir function for a maximum gas adsorption with pressure and amounts of ash and water as variables, and applying the Langmuir function to each of the cells in the grids to calculate an amount of gas detected due to pressure change in each cell over time.

In particular, the Langmuir function (Vi) may be determined by the equation below.

$$V_i = \frac{V_{L-daf} \times (1 - Ash - Moisture) \times P}{(P + P_{L-daf})}$$

In the equation, Vi is a maximum gas adsorption, $V_{L-daf}$ is a Langmuir volume correction constant in dry ash free state, Ash is the ash content in a cell, Moisture is the moisture content in the cell, P is the pressure of the cell, and $P_{L-daf}$ is the Langmuir pressure correction constant in a dry ash free state.

In addition, in the Langmuir experiment, the maximum gas adsorption amount of the core sample depending on pressure may be measured, and the corrected maximum gas adsorption amount (Vi-daf), which is the corrected value of the maximum adsorption amount (Vi) under a premise of a state (daf: dry ash free) in which water and ash are not present and the coal content is 100% in the core sample, may be calculated for each pressure in the core sample.

Subsequently, the Langmuir volume correction constant and the pressure correction constant may be determined so that a plurality of Langmuir functions which are respectively represented as the corrected maximum gas adsorption amounts depending on pressure for the plurality of core samples, may be set as a single Langmuir approximation function.

This will be described in more detail. When an X-axis is a corrected maximum gas adsorption amount ($V_{i-daf}$/P) with respect to pressure, and a Y-axis is a corrected maximum gas adsorption amount ($V_{i-daf}$), the Langmuir volume correction constant ($V_{L-daf}$) and the pressure correction constant ($P_{L-daf}$) may be determined so that a linear functional equation below for the corrected maximum gas adsorption amount ($V_{i-daf}$) best approximates a plurality of points on the X-Y plane measured and calculated in the Langmuir experiment.

$$V_{i-daf} = V_{L-daf} - P_{L-daf}\left(\frac{V_{i-daf}}{P}\right)$$

In the equation, $V_{i-daf}$ represents the corrected maximum gas adsorption amount which has already been calculated in the Langmuir experiment, $V_{L-daf}$ represents the Langmuir volume correction constant, $P_{L-daf}$ represents the pressure correction constant, and P represents the pressure value in the Langmuir experiment.

Meanwhile, in an embodiment of the present invention, the steps (a)-(e) may be performed by dividing the development area into a plurality of regions in a planar direction, and grouping the drilling wells for each of the regions.

The division of the development area may be performed on the basis of a distance adjacent to the drilling well at which the core sample is obtained, or may be performed on the basis of the height on a contour map in a topographic map.

Alternatively, after an investigation is performed in advance on a deposition environment of a topographic layer in the development area, dividing of the development area may also be performed on the basis of equality of the deposition environment. At this point, the deposition environment may include a region in which a channel was present, an ombrotrophic mire, and a rheotropic mire.

Meanwhile, a gas saturation degree of the cell may be calculated by calculating a ratio of the maximum gas adsorption amount to the gas content for each cell.

Advantageous Effects

According to the present invention, there is shown an advanced modeling method in terms of several respects compared to related arts.

Firstly, the entirety of the area to be developed is not set as one target, but the area is divided according to the similarity of deposition environments, the similarity of contour maps, and the distant adjacency, thereby allowing the gas content and the production modeling to better reflect the reality.

Secondly, in related arts, since the gas contents of the cells in the entire grid were estimated through a statistical method with samples of proximate analysis data, moreover, samples of only the gas content for each depth, not only the preciseness but also the reliability thereof was low. However, in the present invention, a trend function is derived through an proximate analysis data about densities, moisture contents, ash amounts, and gas contents, and the trend function is applied to all drilling points for which physical layer investigation was performed. Thus, the number of data used for a statistical method is remarkably increased unlike in related arts. Since the reliability of a statistical method is firstly dependent on the number of sample data, there is a merit in that data estimation can be very precisely performed compared to related arts. In addition, since the trend function is based on understanding of geology and resource engineering and mutiphasic analysis, there is a merit of well reflecting an actual trend.

Thirdly, in the present invention, while ash and water are individually determined, the amount of separated gas is determined by a newly proposed Langmuir function on the basis of the content of coal for each cell, the separation behavior of the actual gas may be represented. These merits could be achieved by performing a proximate analysis of a plurality of core samples and deriving a Langmuir volume correction constant and a pressure correction constant which can be universally applied to these core samples. Through this, not only the production behavior of the gas, but also the initial disposition of production wells for economical production and the information about the operation of production wells over time may be provided, and thus, the economy and efficiency of gas production was increased.

Meanwhile, it is further stated that even when not specifically mentioned herein, an effect and a temporary effect thereof, which are expected by the technical characteristics of the present invention and are described in the specification below, are treated as those described in the specification of the present invention.

* It is clarified that the attached drawings are illustrated as a reference for understanding the technical concept of the present invention, and the scope of the present invention is not limited by the drawings.

MODE FOR CARRYING OUT THE INVENTION

In describing the present invention, detailed descriptions related to well-known functions and matters obvious to a person skilled in the art will be ruled out when the functions and matters unnecessarily obscures the subject matters of the present invention.

Hereinafter, a modeling method for gas production in a coalbed methane reservoir according to the present invention will be described in detail with reference to the accompanying drawings.

Figure 1:
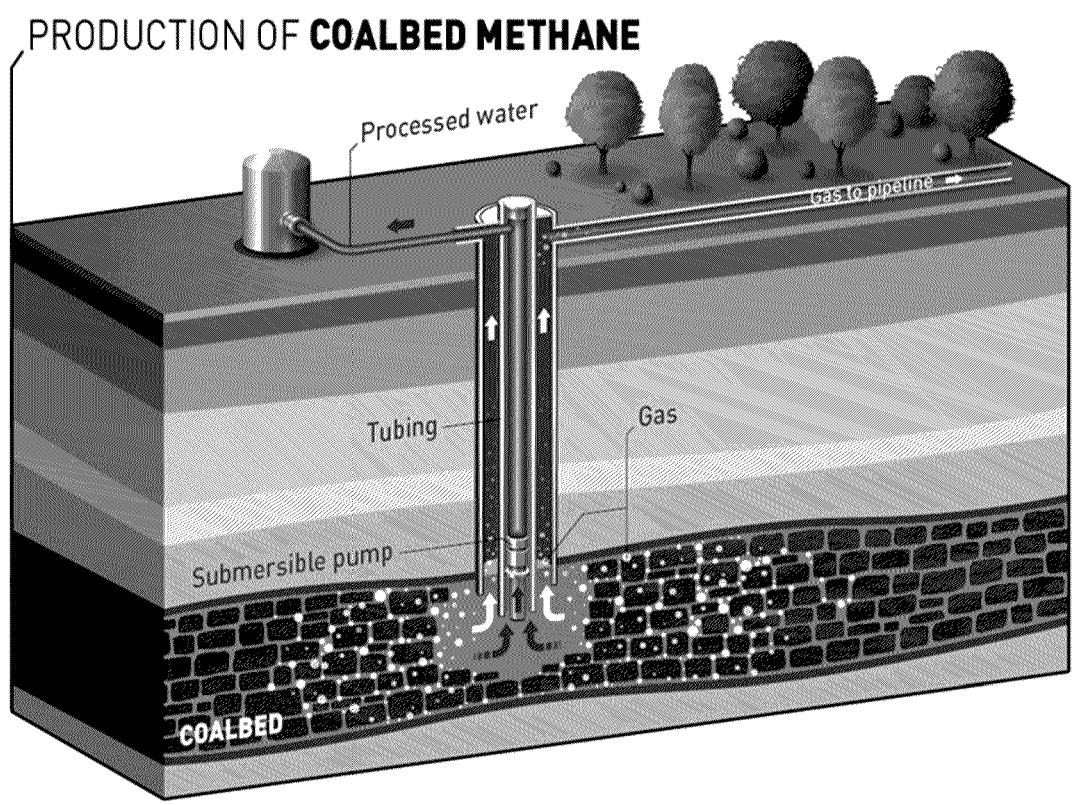
FIG. 1 is a view for illustrating a production structure of coalbed methane (CBM).
Figure 2:
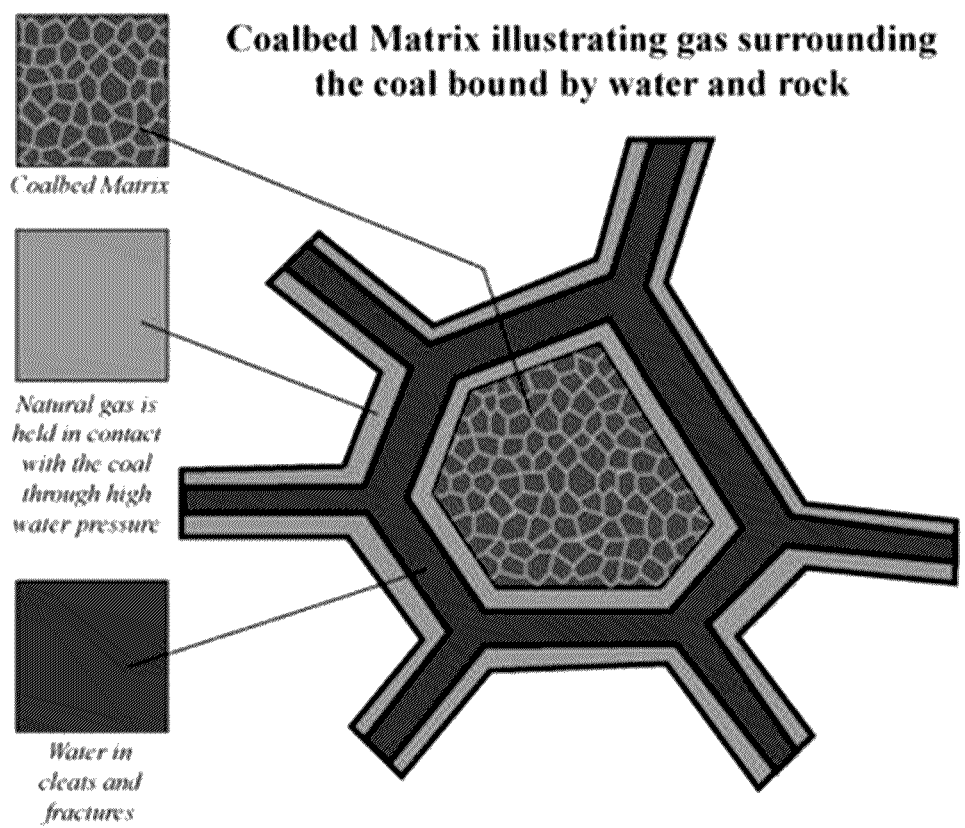
FIG. 2 is a view for illustrating a gas adsorption structure of coalbed methane.
Figure 3:
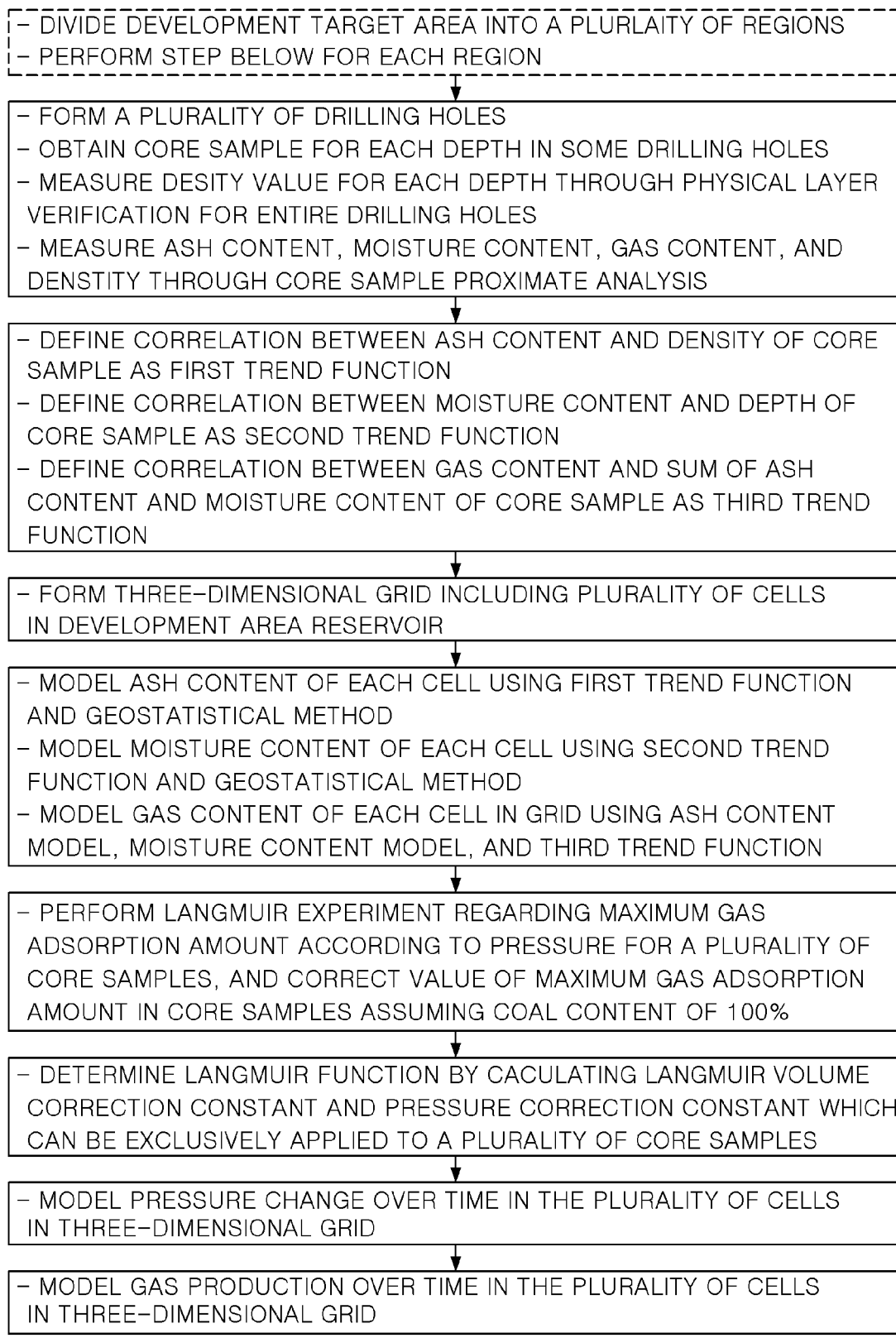
FIG. 3 is a schematic flowchart of a modeling method for gas production in a coalbed methane according to an embodiment of the present invention.

FIG. 3 is a schematic flowchart of a modeling method for gas production of a coalbed methane reservoir according to an embodiment of the present invention.

Referring to FIG. 3, the present invention is roughly divided into: a step of investigating a development area; a step of latticizing the development area for modeling into three-dimensional grids having a plurality of cells; a step of modeling a moisture content, an ash content and gas contents; and a step of modeling an amount of gas production.

The present invention is particularly characterized by modeling the amount of gas production among the steps. For the step of modeling the amount of gas production, modeling of the moisture content, the ash content and the gas content has to be preceded. Furthermore, the modeling of the amounts of ash and water and the gas contents adopted in the present invention is specially developed for the gas production modeling characterizing the present invention.

Thus, hereinafter according to the flowchart illustrated in FIG. 3, the modeling method for gas production in a coalbed methane reservoir will be sequentially described according to the sequence of the flowchart illustrated in FIG. 3.

In a modeling method for gas production in coalbed methane gas (CBM) reservoir (hereinafter referred to as a production modeling method), the development target area is divided into a plurality of regions and a plurality of drilling holes are formed.

Regarding the division of the development target area will be described in detail later, and at this point, only the formation of the drilling holes will be described.

Figure 4:
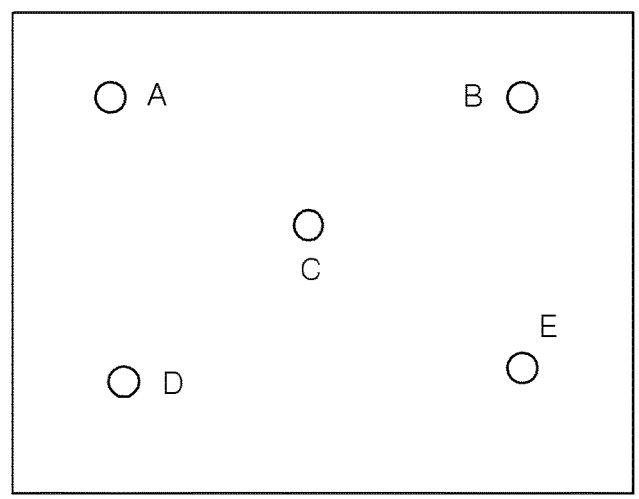
FIG. 4 is a plan view simulating a CBM development area.

FIG. 4 is a plan view simulating a CBM development area. As illustrated in FIG. 4, it is desirable that the drilling holes be formed not to be concentrated in any one portion of a development area, but to be widely distributed. In particular, when a paleogeolmorphic environment or a deposition environment of a target region has already investigated, it is desirable that drilling holes be respectively formed in regions having deposition environments different from each other. Alternatively, it is desirable that a drilling well be individually formed according to the heights of contour maps in the development target area. This is because the structure of topographic layers may appear different from each other according to the deposition environments or the heights of contour map.

That is, when forming a drilling hole, which is the first step of the present invention, it is necessary to consider the difference in deposition environments, contour maps, etc., and also when such a preceding investigation has not been performed, it is necessary to distribute the drilling as widely as possible to thereby reflect various geological environments.

In addition, each of the drilling holes may extend vertically downward as short as several hundred meters and as long as several kilometers.

After the drilling holes are actually formed, core samples are obtained for each depth with regard to a portion of the drilling holes. In addition, with regard to all drilling holes, a physical layer investigation is performed to measure the density for each depth. With regard to the core samples, a proximate analysis is performed. In the proximate analysis, a small amount of core samples are taken for each depth and each of the moisture content, the ash content, the density, the gas content, etc. is measured.

When the moisture content, the ash content, the gas content, and the density are measured through the proximate analysis, a first trend function to a third trend function are derived.

Figure 5:
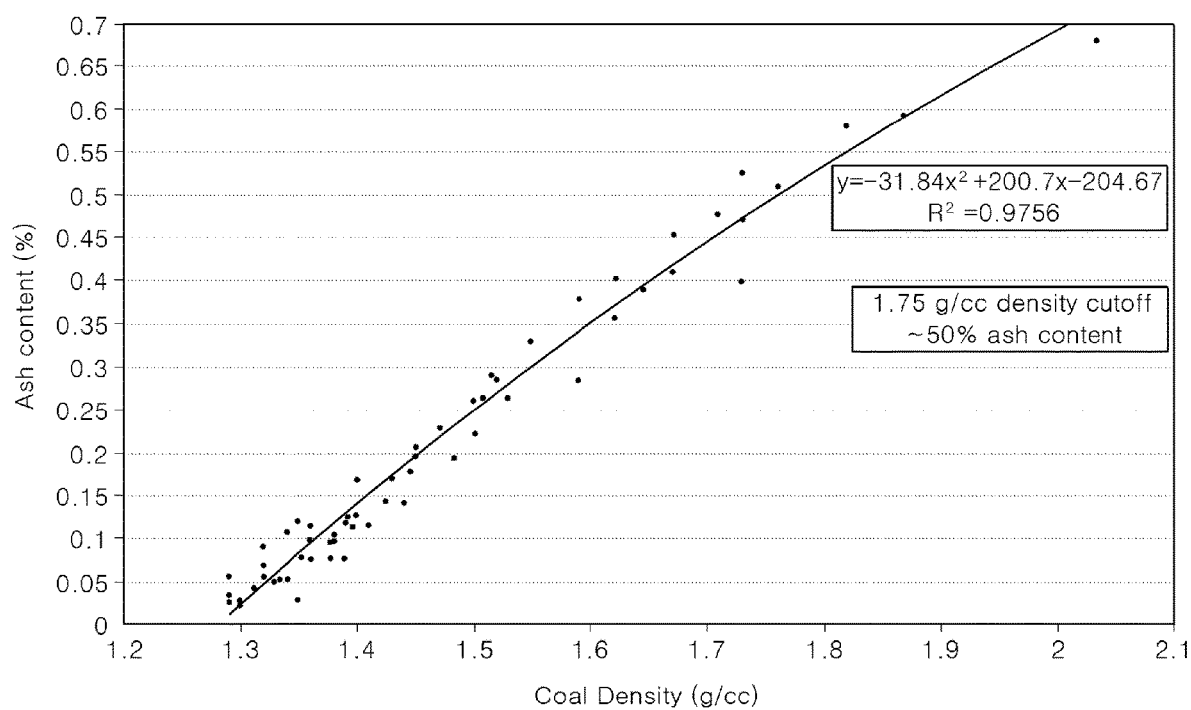
FIG. 5 is a graph of density versus ash amount in a proximate analysis result of a core sample.

The first trend function is the function which represents the correlation between the ash contents and densities of the core samples. That is, the ash content and the density value are respectively measured at points of the core samples, and then, as illustrated in FIG. 5, are plotted on a graph with the X-axis representing the density and the Y-axis representing the ash content. The points marked on the graph are the results of the proximate analysis and are represented by only the relationship between the ash content and the density regardless of the depth. Of course, an identification symbol is applied to each of the points and thus, the depth, at which the point has been obtained, has been determined.

As such, after the densities and the ash contents are plotted, the first trend function which reflects the trend of these data can be set by using a mathematical method such as a least squares method. As described also in the above, the CBM reservoir is composed of coal, ash, and water. Here, the ash means rock rather than coal. The density of coal is low and the density of rock, which is not coal, is high. Accordingly, observing that the ash content deeply relates to the density, in the present invention, the first trend function regarding the ash content is determined as the correlation with the density.

The second trend function represents the correlation between the moisture content and physical properties of the core sample. The physical property may be the density or the ash content. In addition, the second trend function is not a physical property, but represents the correlation between the depth and the moisture content. The method for deriving the second trend function is the same as that for deriving the abovementioned first trend function. In the present example, the second trend function regarding the moisture content was derived through the correlation with the depth.

Figure 6:
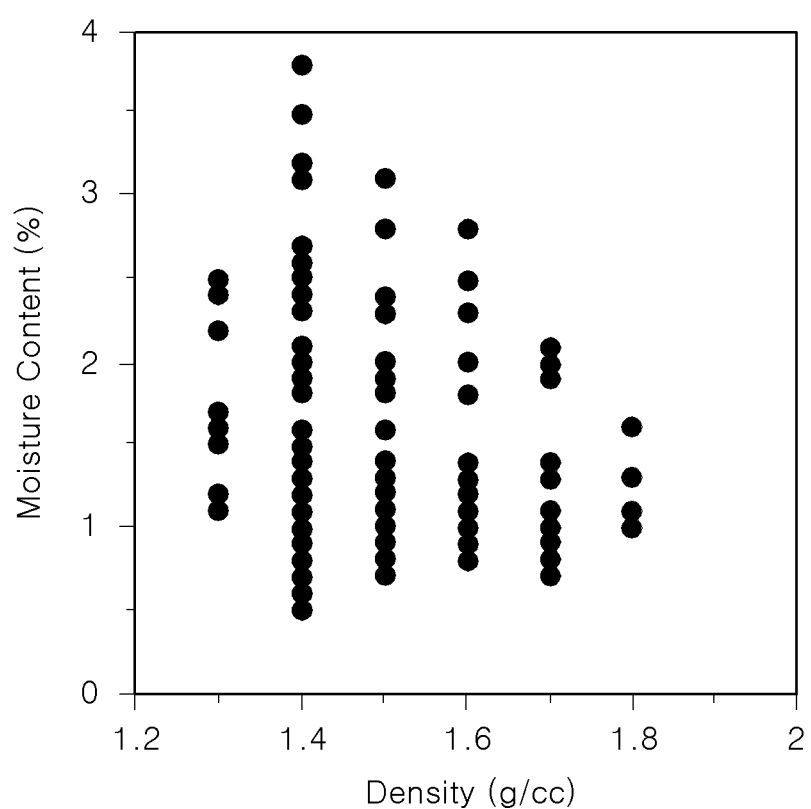
FIG. 6 is a result of density versus moisture content of a core sample.
Figure 7:
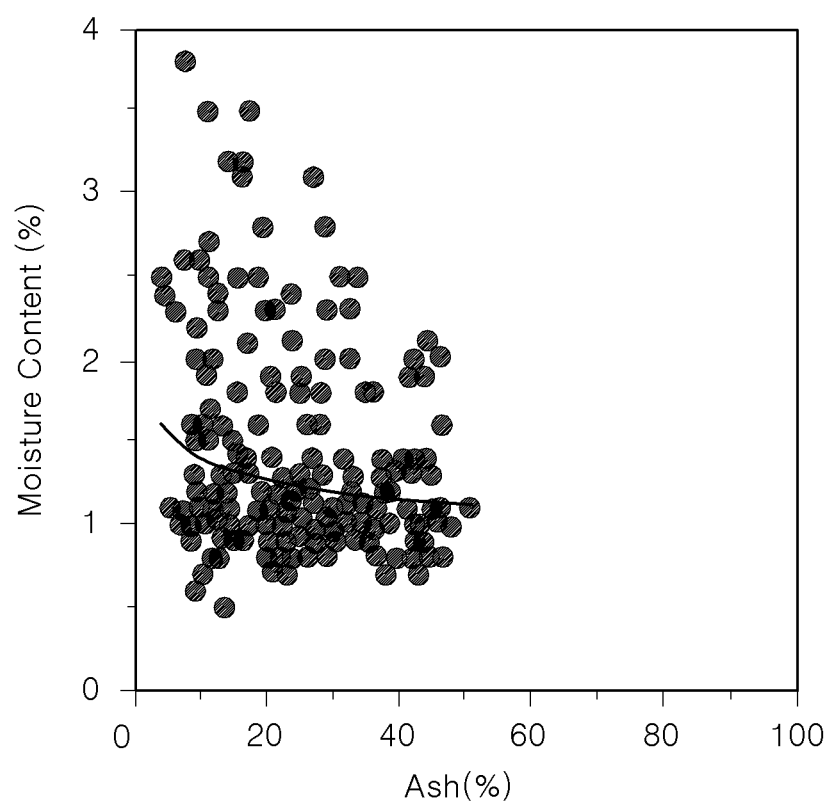
FIG. 7 is a result of ash amount and moisture content.
Figure 8:
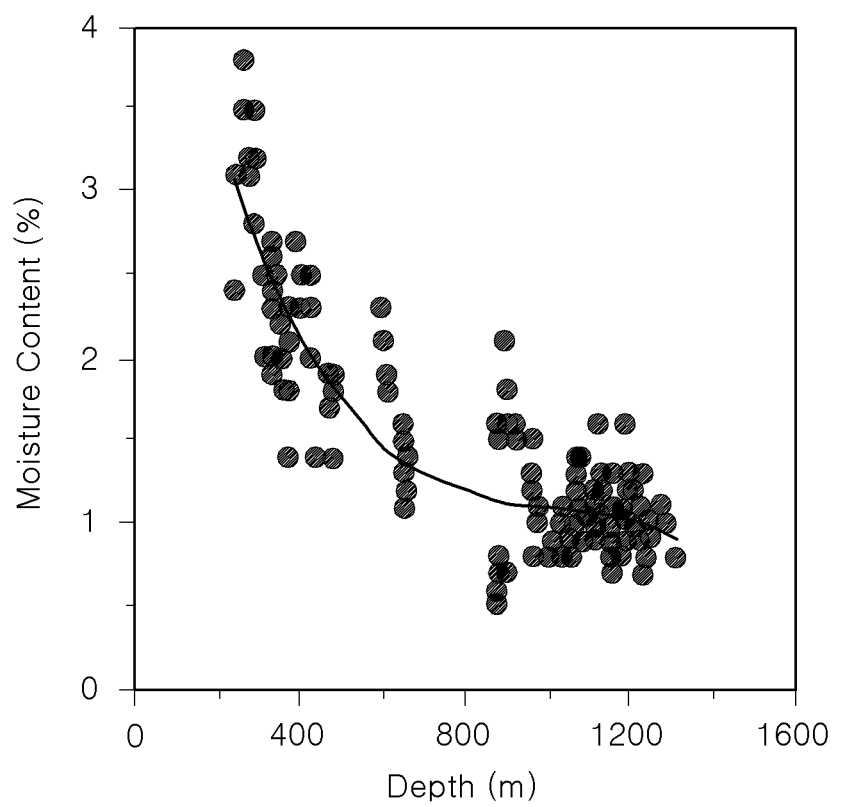
FIG. 8 is a result of moisture content versus depth.
Figure 9:
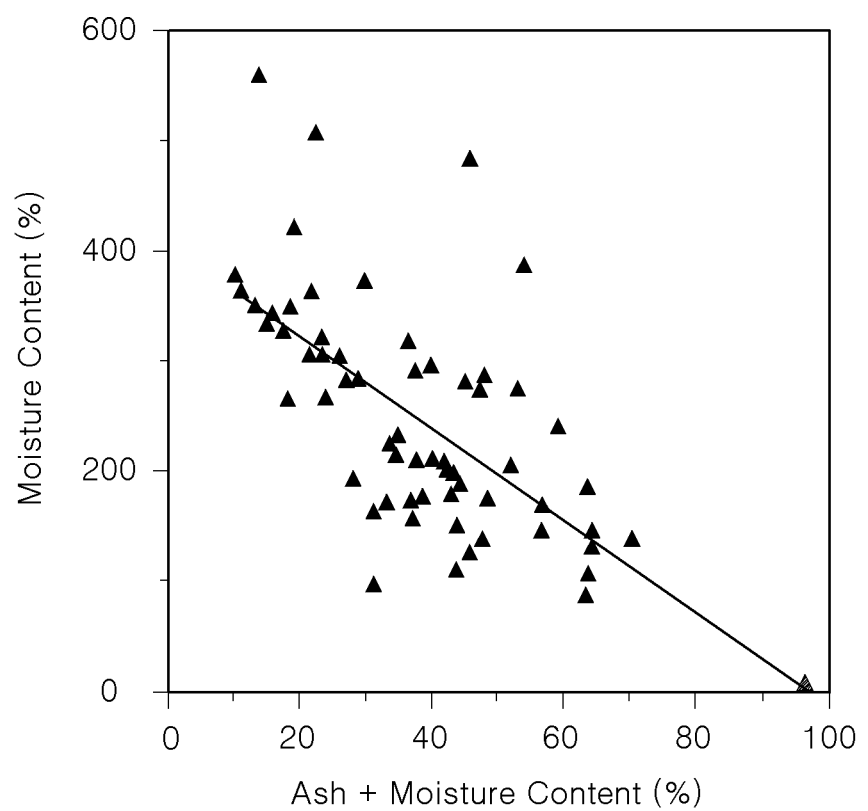
FIG. 9 is a result of the sum of moisture content and ash amount versus a gas content.

FIG. 6 is a result of plotting moisture contents according to the densities of core samples, FIG 7 is a result of plotting moisture contents according to ash contents, FIG. 8 is a result of plotting the depths according to moisture contents, and FIG. 9 is a result of plotting the sums of moisture contents and ash contents and gas contents.

Referring to the graphs in FIGS. 6 and 7, no particular trend is formed between the moisture contents and the densities, and between the moisture contents and the ash contents. However, referring to graph in FIG. 8, it can be understood that a certain trend is formed between the moisture contents and the depths. Accordingly, the moisture contents exhibit a tendency depending on the depths rather than the densities. The deeper the depths, the higher the underground pressure, and thus, considering the fact that moisture is discharged by the pressure, sensitive changes in the moisture contents according to the depths seem to be reasonable results. Thus, in the present invention, the second trend function was derived as the correlation between the moisture contents and the depths.

The third trend function represents the correlation in core samples between the sums of the ash contents and the moisture contents and the gas contents. The method for deriving the third trend function is also the same as that for deriving the first trend function. That is, each of the points of core samples are plotted on a graph with the X-axis representing the sums of ash contents and moisture contents and the Y-axis representing gas contents. In addition, the trend of these point data is derived through a mathematical method. As such, the third trend function was derived from the correlation between the ash contents and the moisture contents, and since the residual contents except for the ash contents and the moisture contents are coal contents, the third trend function consequently determined the correlation between the coal contents and the gas contents. On the basis of the scientific principle that gas is adsorbed only onto coal, in the present invention, the third trend function regarding the gas contents was determined as the relationship between the ash contents and the moisture contents.

As described above, after the first to third trend functions were derived, modeling is performed in earnest by using a computer.

For the modeling, firstly, a reservoir is specified in a development target area, the reservoir is latticized in three dimensions to thereby be divided into a plurality of cells on a computer modeling program. That is, coordinates are given along the X-, Y-, and Z-axes and the reservoir is divided into a plurality of cells.

After three-dimensional grids has been formed as described above, the modeling regarding ash contents and the modeling regarding moisture contents are performed. Each of the model shares the three-dimensional grids.

In the modeling of the ash contents, firstly, the first trend function is applied to all the cells on which physical layer investigation has been performed. For example, a specific drilling well is fixed at any one coordinate (cell) on the X-Y plane on the grids. In addition, this drilling well will pass through a plurality of cells along the Z-axis. That is, the drilling well is vertically disposed along the Z-axis on the grids. A plurality of drilling wells are formed on the modeling. In the development area, the plurality drilling wells rather one were formed, a physical layer investigation was performed regarding the plurality of actual drilling wells, and density data for each depth has all been obtained through the physical layer investigation in each of the drilling wells. Here, the terms "for each depth" may be replaced by the term "for each cell" from a viewpoint of modeling. This is because division into the cells is performed downward according to depths at the coordinate of the formed drilling well. Consequently, density values are respectively set to all the cells through which the drilling well passes. In addition, the first trend function is applied to all the cells.

In the present example, the first trend function was derived as described below.

Ash content=83.74×d (density)−101.39 . . . first trend function

The above trend function may appear differently according to the geological environment of the reservoir. That is, the trend function should be individually derived through a mathematical method rather than as one fixed value.

Since the density is defined as a variable in the first trend function regarding the ash content, when the density of each cell is input to the first trend function, the ash contents of the cells through which the drilling well passes are derived respectively.

Subsequently, a modeling is performed in which ash contents of all the cells in the grids are estimated by a geostatistical method by using the cells for which the ash contents have already been set as samples. The geostatistical method is a statistical or mathematical method, and is implemented through software particularly used in the fields of geology and energy resource. Since this is a well-known technique in the related field, detailed descriptions thereon will not be provided. In the result (not shown) of the modeling of the ash contents, the ash contents appear to be different for each region.

Then, a water content modeling is performed.

The water content modeling is also performed through the same method as the ash content modeling. Densities, that is, Z-axis coordinate values are respectively set on the cells through which the drilling well passes. In addition, a second trend function is applied to the cells through which the drilling hole passes.

In the present example, the second trend function is defined as described below.

moisture content $=5.39+1.2\times10^{-2}D+1.21\times10^{-5}D^2+4\times10^{-9}D^3$ . . . second trend function (here, D is depth)

Like the first trend function, the second trend function is not defined as one too, and is derived for each reservoir through a proximate analysis.

Since the second trend function is a function of depth, when the depths of the cells through which the drilling well passes are input, the moisture contents of all these cells are calculated. Subsequently, as described before, the moisture contents of all the cells in the grid are estimated through a geostatistical method by using the cells to which the moisture contents have already been set as samples. It may be understood from the result (not shown) of the moisture modeling that the moisture contents are different for each cells.

Now, each of the ash content model and the moisture content model is determined, and since each model shares the grid, the ash content model and the moisture content model may easily be integrated. Consequently, the ash contents and the moisture contents have been respectively set to all the cells in the grids.

Then, a gas content modeling will be performed.

In the above, the gas contents were set by the third trend function according to the sums of the ash contents and moisture contents. In the present example, the third trend function is defined as described below. Of course, the third trend function is also a concept that is set different according to reservoirs.

gas content=403−4.165×(ash content+moisture content) . . . third trend function

As shown above, the sum of the ash content and the moisture content are set as a variable in the third trend function. Since the ash content and the moisture content have already been set to all the cells in the grids through the ash content model and the moisture content model, the gas contents of all the cells may be estimated by applying the third trend function to all the cells.

In the above, the ash contents and the moisture contents of all the cells were estimated by obtaining data regarding the cells through which the drilling well passes and then using a geostatistical method with the data used as samples. However, the third trend function regarding the gas contents was set as a function using the sum of the ash content and the moisture content as a variable, and thus, as soon as the sum of the ash content and the moisture content are input, the gas contents are calculated by using sample data without using the geostatistical method.

In related arts, a method in which modeling was performed by using only the result of a proximate analysis regarding a core sample was adopted. That is, a gas content was measured for each depth through a proximate analysis with regard to the core sample obtained from a drilling well, and then, the data for each depth was input to vertical cells through which the drilling well passed. In addition, the gas contents regarding all the cells in the grid were estimated by using a statistical method with the data as samples. As mentioned above, there are substantially large number of drilling wells in the grid, but among these, the number of drilling wells from which the core sample is obtained is very restricted. Consequently, in the related methods, there is a limitation in that the number of sample data which serve as a base for a statistical method is very small. Statistics has a characteristic that the more the number of data, the preciser the statistics. Consequently, there was a limitation in that the gas content of each cell in the grid cannot be precisely estimated through the related methods.

However, the present invention is characterized in that the result of a proximate analysis and the result of a physical layer investigation are used together. Almost all drilling wells are physically verified, and when a trend function is defined through a proximate analysis with regard to core samples, data with the level of proximate analysis can be acquired for all the drilling wells by inputting physical layer investigation data to the trend function. Since the number of data for modeling becomes remarkably large, a result which may be reliable even when using a statistical method can be derived.

In addition, also in the result of proximate analysis, while only gas contents were directly measured in the related arts, gas contents, ash contents, moisture contents, and densities are all measured in the present invention. In addition, elements for which a trend is formed from the relationships therebetween are selected, and a trend function is determined. As described above, the trend function is determined by checking that moisture contents have a better relationship with depths than with densities or ash contents. In addition, rather than just checking the correlation through data plotting, the elements which form correlations were selected on the basis of geological, geotechnological understanding of the CBN reservoir. Deriving the correlation between ash content and density, the correlation between moisture content and depth, and the correlation between gas content and the sum of ash content and moisture content (that is, coal content) is largely based on such theoretical knowledge. That is, in the present invention, trend functions were derived through a theoretical basis regarding geology and resource engineering and a data analysis using actual data, and thus, very high reliability may be ensured.

Meanwhile, in the present invention, determining the gas content by using a relation between the ash content and moisture content is for use in production modeling when methane gas is finally produced. The production modeling is a dynamic modeling in which states of the cells vary according to the pressure change over time. More specifically, in the dynamic modeling, since gas is separated and discharged in each cell, gas contents of the cells vary continuously over time. In addition, the contents of ash and moisture serve as important factors in such a change.

Hereinafter the production modeling which is a core characteristic of the present invention will be described.

Referring again to FIG. 3, for production modeling, firstly, a Langmuir experiment is performed with regard to a plurality of core samples. The Langmuir experiment is mainly used in chemical fields and is used for finding the adsorption performance of a gas. In the present invention, the Langmuir experiment is performed to determine the coal adsorption amount of methane gas. The CBM refers to an energy resource with a form in which methane gas is adsorbed onto coal, and when the pressure is released by drilling a production well in a reservoir, coalbed methane is separated from coal according to a pressure change inside the reservoir and is discharged through the production well. Thus, the change in the adsorption amount of methane gas is directly connected to the production of methane gas.

In the Langmuir experiment, while the core samples are sealed, methane gas is injected by applying a pressure. At a specific pressure, methane gas is adsorbed onto the core samples, but when a certain amount is reached, methane gas is not adsorbed anymore and a maximum value is reached. In the Langmuir experiment, a maximum adsorption amount is measured under the specific pressure at this time. In addition, the pressure is further increased and the maximum adsorption amount is updated and measured under the increased pressure. When the adsorption amount is measured while the pressure is continuously increased through such a method, a point appears at which the adsorption amount is not increased any more even when the pressure is increased.

Figure 10:
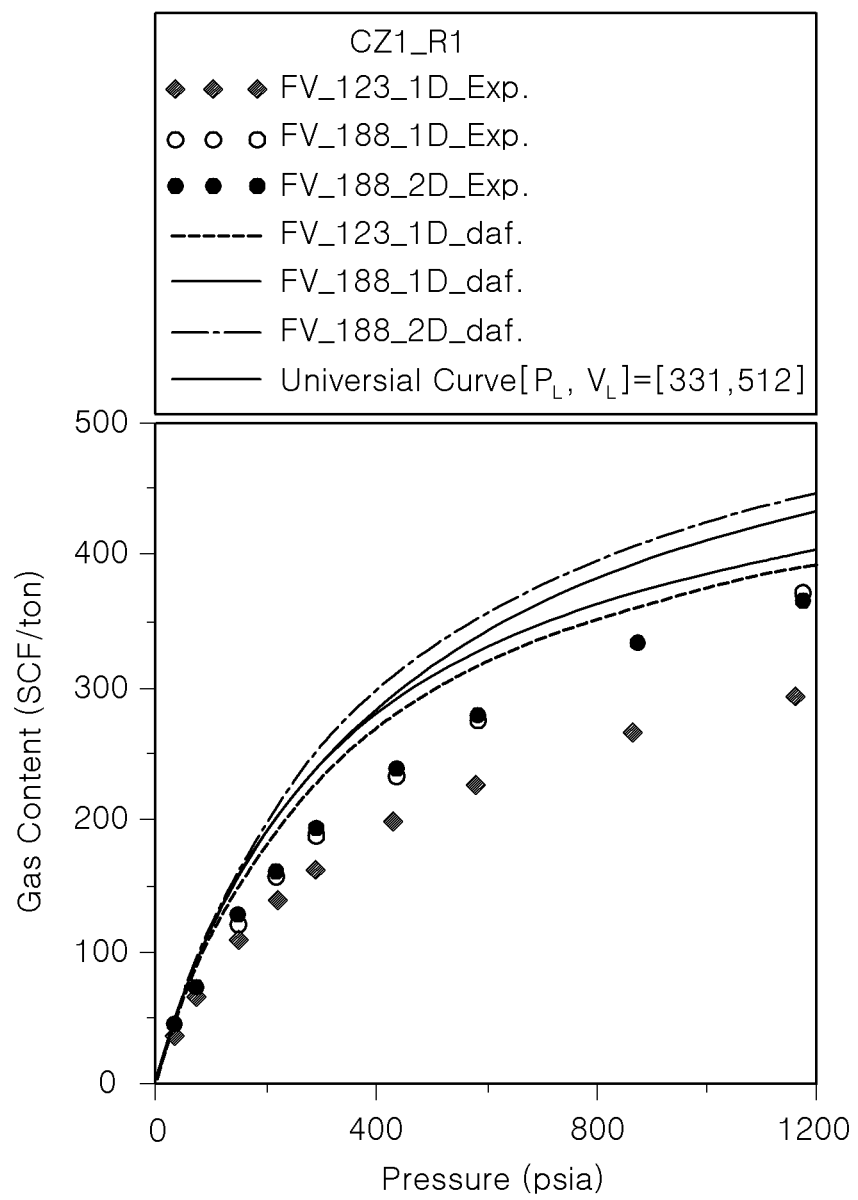
FIG. 10 is a view for illustrating a Langmuir experiment and a Langmuir function.

FIG. 10 illustrates a graph representing the Langmuir experiment. Referring to FIG. 10, the X-axis represents pressures and the Y-axis represents gas adsorption amounts (in volume, unit: SCF/ton). FIG. 10 illustrates a result of performing the Langmuir experiment regarding three core samples (black circular dots, white circular dots, and black rectangular dots). In all the core samples, the maximum adsorption amount is increased while the pressure is increased, but at a pressure level of approximately 1,200 psia, the adsorption amount is not increased any more. A function representing a trend in actual measurement data in FIG. 10, for example, black dots, is a Langmuir function. The Langmuir function is represented as follows.

$$V_i = \frac{V_L \times P}{(P + P_L)}$$

In the Langmuir function above, $V_i$ is a maximum adsorption amount at a specific pressure (P), $V_L$ is a maximum adsorption amount when the adsorption amount is not increased any more even when the pressure is increased and is a Langmuir volume constant, $P_L$ is a pressure value at a volume which is ½ of the Langmuir volume constant and is referred to as a Langmuir pressure constant. The Langmuir function represents the Langmuir curve of FIG 10 in a form of an approximation function. When the Langmuir volume constant and the pressure constant are determined through the Langmuir experiment, the maximum gas adsorption amounts can be determined at all pressures between an adsorbing body (e.g. coal) and gas.

However, due to the characteristics of the CBM, when the Langmuir experiment is applied as it is to CBM production modeling, desired result cannot be obtained. That is, although the component, which adsorbs gas in CBM is restricted to a coal component, moisture and ash, are together present in addition to coal in a CBM reservoir. Likewise, coal, ash, and moisture are present together in core samples. Accordingly, in the present invention, although a Langmuir experiment as described above is performed with regard to core samples, a step of correcting a maximum adsorption amount according to pressure is included. For example, when a Langmuir function is calculated with regard to a core sample, a maximum gas adsorption amount (e.g., K) is determined at a specific pressure value. In addition, a case in which this core sample contains components such that coal:ash:moisture=5:3:2, that is, a case in which coal is contained by a ratio of 50% is assumed. Here, assuming that coal is contained by the ratio of 100% in the core sample, the value of the maximum gas adsorption amount (K) is corrected according to the ratio. That is, K is multiplied by 2 and thus, the maximum gas adsorption amount is changed into 2K. In the present invention, this is referred to as a corrected maximum gas adsorption amount.

When the maximum gas adsorption amount is corrected according to pressure, the Langmuir curve is shown in a form of a dotted line in the upper side of FIG 10. Since the gas adsorption amount is increased, a curve is formed entirely on a higher side than the original actual measurement value It should be noted that the separation degree between the Langmuir curves after correction of three core samples becomes smaller than that in the trend of the Langmuir curve (not shown) before correction. Although coal contents are different according to core samples, since the correction step is based on the coal content of 100%, a plurality of Langmuir curves converge to each other. In the viewpoint of precisely determining the maximum gas adsorption amount at a specific pressure, it is desirable that the Langmuir function (curve) be calculated when the coal content is 100% except for moisture and ash with regard to a reservoir as described above. Of course, to this end, determining the moisture content and the ash content for each cell in the reservoir should be preceded, and in the present invention, as described above, modeling has already been performed with regard to the moisture content and the ash content. This will be additionally described later.

Returning to the experiment, the Langmuir experiment is performed with regard to the plurality of core samples, and the maximum gas adsorption amount is corrected by considering coal contents in the core samples, thereby calculating a corrected maximum gas adsorption amount. Then, a Langmuir function is derived which can be universally applied to the plurality of core samples. Determining a separate Langmuir function for each core sample is not easy because the number of drilling wells from which a core sample is obtained is merely small. Thus, the Langmuir approximation function is derived so that the error becomes the smallest with regard to the Langmuir curves of the plurality of core samples. This is obtained through a mathematical method such as a least squares method like the first trend function to third trend function described above.

Using a form of lenear function as the approximation function is easiest and is also most reliable. Accordingly, also in the present invention, the form of the linear function is selected to determine the Langmuir function with regard to the plurality of core samples.

The Langmuir function was converted into the form of the linear function through a conversion step from the original Langmuir function (equation 1 below) to equation 5.

$$V_i = \frac{V_L P}{P_L + P} \quad (1)$$

$$V_i \left( \frac{P_L + P}{P} \right) = V_L \quad (2)$$

$$V_i \left( \frac{P_L}{P} + 1 \right) = V_L \quad (3)$$

$$P_L \left( \frac{V_i}{P} \right) + V_i = V_L \quad (4)$$

$$V_i = V_L - P_L \left( \frac{V_i}{P} \right) \quad (5)$$

In the equations above, $V_i$ is a maximum gas adsorption amount, P is a pressure, and the two values above are the values already measured through a Langmuir experiment. In addition, $V_L$ is a Langmuir volume constant, and $P_L$ is a Langmuir pressure constant. Since the X-axis represents the ratio ($V_i$/P) of a maximum gas adsorption amount to a pressure in the equation 5 above and the Y-axis represents the maximum gas adsorption amount ($V_i$) in the equation 5) above, it can be seen that the function is a linear function. In the equation 5) above, values of the X- and Y-axes are the values already measured through the Langmuir experiment. In addition, the slope is a Langmuir pressure constant ($P_L$) and the Y-axis intercept is a Langmuir volume constant ($V_L$). In addition, since the value of $V_i$ herein is corrected maximum gas adsorption amount, in order to describe in equation 5) a state in which moisture and ash are both removed, daf (dry ash free) is attached to Vi as a subscript. A subscript is not separately attached to the pressure value because the pressure values are the same in the original state and in a daf state. The Langmuir volume constant and the pressure constant are also respectively referred to as the Langmuir volume correction constant and the pressure correction constant by attaching daf thereto. Finally, equation 5) in which the subscript is attached may be rewritten as follows.

$$V_{i-daf} = V_{L-daf} - P_{L-daf} \left( \frac{V_{i-daf}}{P} \right)$$

Figure 11:
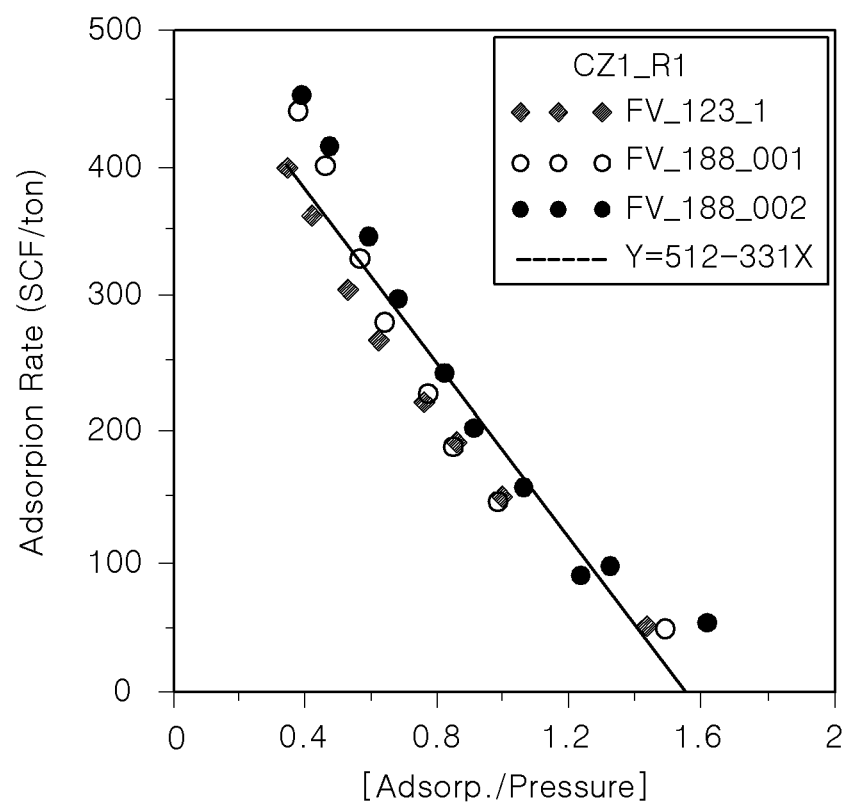
FIG. 11 is a view for illustrating a process in which a Langmuir function is derived and a Langmuir volume correction constant and a pressure correction constant.

In FIG. 11, the X- and Y-axes were set as the forms described above, and the values already measured from the Langmuir experiment were plotted. Three core samples were each illustrated.

Referring to FIG. 11, it can be understood that the greater an X-value, the smaller the corresponding Y-value. The function has a form of linear function with a negative slope. A Langmuir function, which minimizes the errors with respect to the plotted value, only needs to be obtained in a form of equation 5). That is, a Langmuir volume correction constant and a pressure correction constant which remain as unknowns are mathematically calculated.

After the Langmuir volume correction constant and a pressure correction constant have been obtained, a gas adsorption modeling is performed with regard to each cell in the reservoir.

That is, the Langmuir function is applied to each of the cells in a three-dimensional grid. The final Langmuir function is determined as follows.

$$V_i = \frac{V_{L\text{-}daf} \times (1 - \text{Ash} - \text{Moisture}) \times P}{(P + P_{L\text{-}daf})}$$

Here, $V_i$ is the maximum gas adsorption amount, $V_{L\text{-}daf}$ is the Langmuir volume correction constant, Ash is the ash content of a cell, Moisture is the moisture content of the cell, P is the pressure of the cell, and $P_{L\text{-}daf}$ is the Langmuir pressure correction constant.

In the above Langmuir function, the volume correction constant and the pressure correction constant which have been obtained through the Langmuir approximation function were used. In addition, a value from which ash and moisture are subtracted is multiplied to the volume correction constant. Since the moisture content and the ash content have already been determined for each cell in the grid, the value from which ash and moisture are subtracted is multiplied to the volume correction constant. When the above Langmuir function is used, the maximum gas adsorption amount according to pressure may be determined. In addition, a pressure value should be input to the Langmuir function. When a production well is drilled while the initial pressure values of reservoir is input, the pressure gradually decreases while the pressure inside the reservoir is released. That is, the pressure has a value varying over time. Accordingly, for the gas production modeling, a temporal pressure change model of the reservoir should be set to the grid. However, any one among the pressure change modeling method with regard to the reservoir of existing traditional gas or the non-traditional gas only need to be selected, and this is a well-known feature in the energy/resource engineering field. Therefore, detailed description will not be provided.

As described above, information about the ash content, the moisture content, and the gas content in each cell in the three-dimensional grid which simulates a reservoir, and the pressure change over time when a production well is drilled is modeled. In addition, the Langmuir function about the maximum gas adsorption amount according to pressure was applied.

Then, the gas production may be predicted through a simulation over time. For example, with regard to each cell in the grid, the gas content versus the maximum gas adsorption amount, that is, a saturation degree may be presented. That is, when the Langmuir function is applied in an initial pressure state before drilling a production well, the maximum gas adsorption amount is calculated for each cell, and the gas content has already been input to each cell. There may be a cell having the saturation degree approaching 1, and there may be a cell having the saturation degree farther separate from 1. According to the saturation degree, the color of each cell may be represented differently (not shown). The saturation degree of 1 means that the present gas content nearly corresponds to the maximum gas adsorption amount. Conversely, when the pressure of the cell decreases, the maximum gas adsorption amount is interlocked with the pressure and also decreases, and when the maximum gas adsorption amount is smaller than the gas content, methane gas must be separated from the cell. This separated gas is discharged through the production well. Consequently, the difference between the present gas content and the maximum gas adsorption amount becomes the amount of gas production.

Conversely, in some cells, the present gas content may be much smaller than the maximum gas adsorption amount. That is, the saturation degree may be very low. In such cells, even when the pressure of the reservoir decreases through the drilling of a production well, gas is not immediately separated. While the pressure continuously decreases and the maximum gas adsorption amount decreases together, at the instant when the maximum gas adsorption amount and the present gas content becomes the same, that is, from the instant of reaching saturation, gas is produced.

Consequently, gas is separated and produced from different time points in the cells inside the grid.

In the present invention, the change of the gas production over time may be predicted through the above modeling.

In addition, in the present invention, the Langmuir function and the present gas content are presented as a saturation degree in a grid, and thus, the present invention may help determine where to drill a production well. That is, when the production well is drilled in a place with the highest saturation degree, it may be economically advantageous because gas is produced from the instant of drilling. In addition, from the change in the saturation degree, where to continuously produce gas and the like may be predicted. That is, a Langmuir volume at each cell of the modeling may be represented. In addition, since the Langmuir volume represents the change in the gas adsorption amount, the change over time may be checked.

In the existing gas production modeling, the modeling is performed such that the gas separation behavior is the same in all the cells. Accordingly, when a dynamic modeling is performed, the pressure is gradually lowered in a form of a concentric circle with respect to the production well. Naturally, it was predicted that the production is the same according to radii centered on the production well. That is, the preciseness and reliability of the production model which do not reflect the state of actual gas production at all was very low.

However, in the present invention, ash contents, moisture contents, and gas contents are precisely modeled for each cell. Also, based on this, coal contents are precisely modeled for each cell. In the present invention, based on the fact that the adsorption and separation of methane gas occurs only on coal, the amount of gas separation may be calculated, and thus, in the present invention, it becomes possible to predict the separation behavior very precisely.

In addition, since the gas saturation degree may be checked for the entire reservoir, it becomes possible to precisely design the position of forming a production well and operation direction of the production well over time.

Meanwhile, so far, it have been described that the above step is performed with regard to the entire CBM development area. However, it is desirable that the above step be performed for each region after dividing the development area into a plurality of regions. Accordingly, in an example of the present invention, dividing the development area into plurality may be preceded in advance. This will be described in more detail.

Unlike the traditional gas, since the CBM is not abundant intensively in any one place but is distributed in wide region, the development area is also wide, and as a result, the geological environment or deposition environment is shown differently even in the same development area.

Figure 12:
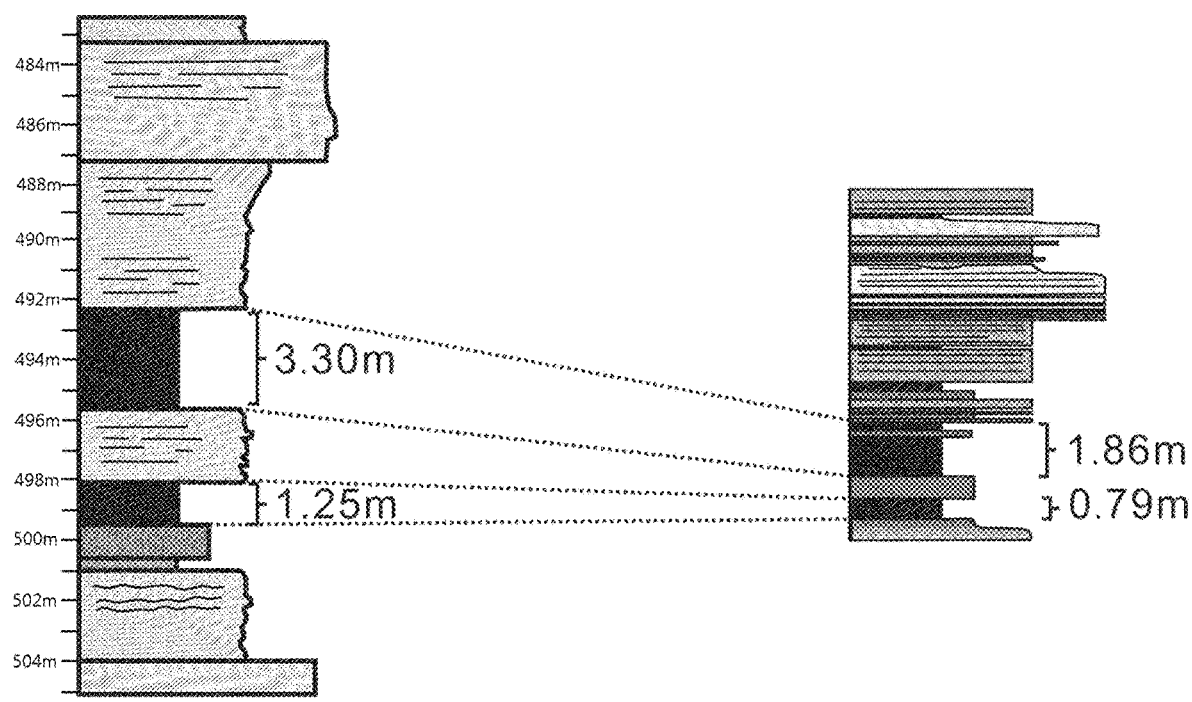
FIG. 12 illustrates a resultant geological columnar section regarding two drilling holes separated by 70 m in a CBM development area.

In addition, also when the difference in distance is small, there is a case in which geological environments are very different. FIG. 12 illustrates a result of physical layer investigation regarding two drilling holes separated by the distance of 70 m. Although 70 m is a very short distance from geological viewpoint, it can be understood that geological conditions are very different.

Figure 13:
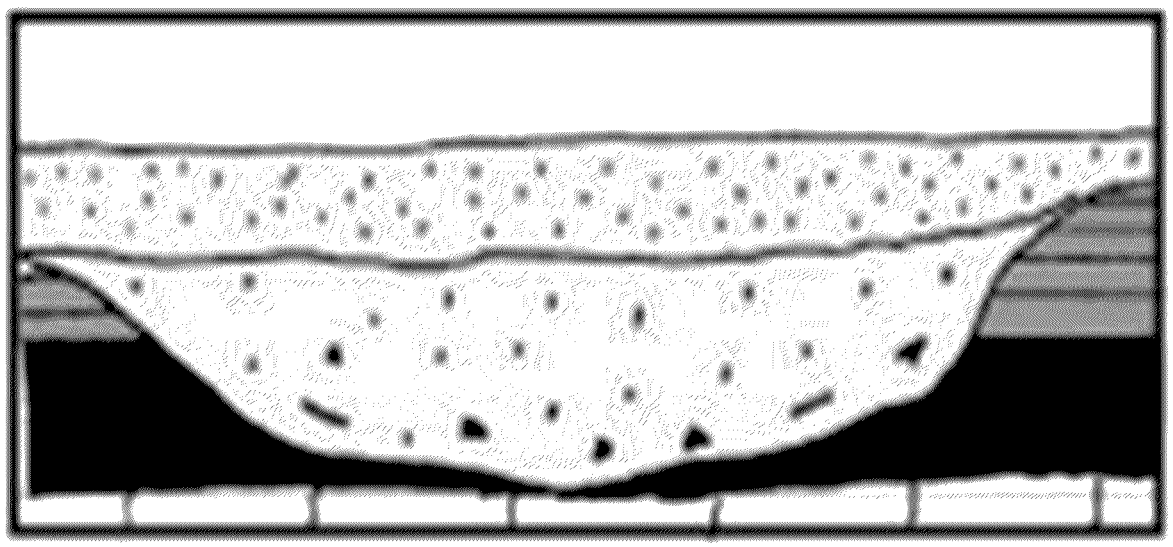
FIG. 13 is a schematic view illustrating a geological environment in which a channel passes through on a coal layer.

Although described above, paleogeomorphic environments or deposition environments of a development area exert very remarkable influence on coal facies. For example, in case of a region through which a channel passes through in a paleogeomorphic environment or a deposition environment, changes in deposition phase are very remarkably shown. FIG. 13 is a schematic view illustrating a geological environment in which a channel passes through on a coal layer.

The geological structure illustrated in FIG. 13 shows the area represented by columnar geological map (the result of performing physical layer investigation). Referring to FIG. 13, it can be understood that channels developed on the upper side after a coalbed had been deposited. Sand stone is mainly deposited in a channel region. When a channel develops, a phenomenon occurs in which lower strata are deeply eroded by water flow. In FIG. 12, the fact that the thicknesses of coal layers separated by 70 m at the same depth are quite different reflects the influence of erosion in the coal layer of a channel.

Figure 14:
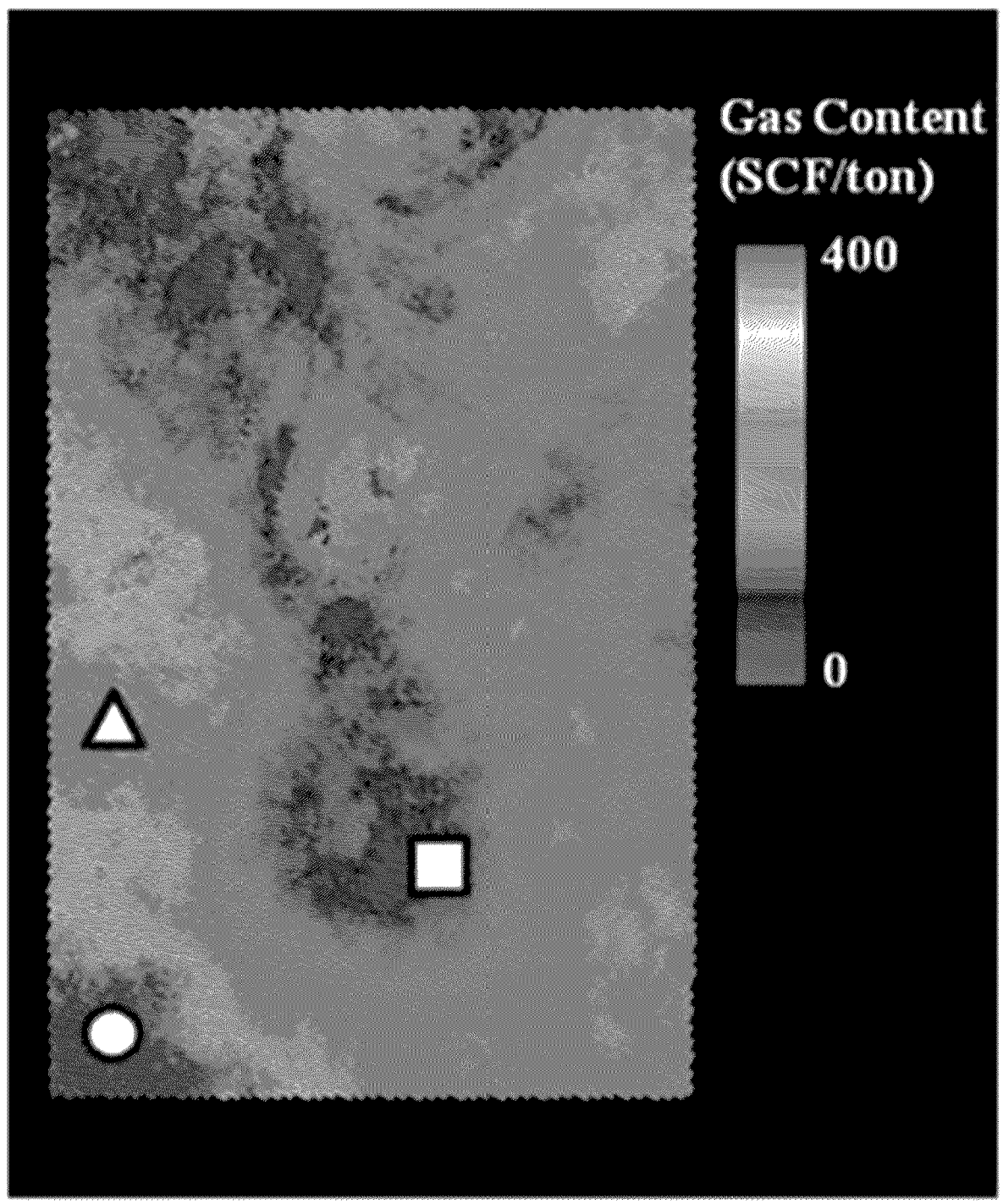
FIG. 14 is a distribution diagram illustrating a gas content for each region in a CBM development area.
Figure 15:
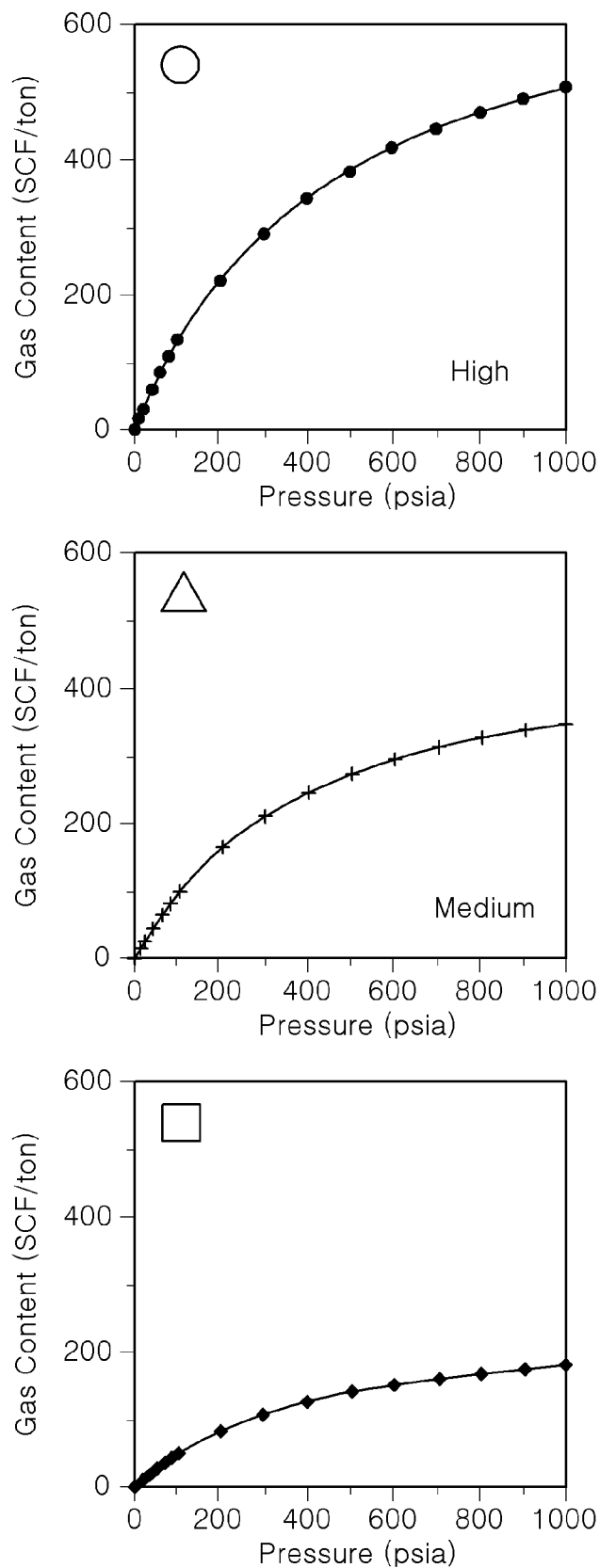
FIG. 15 is a graph illustrating a gas adsorption amount due to a pressure in regions depicted by circles, triangles, and rectangles in FIG. 14.

FIG. 14 is a distribution diagram illustrating a gas content for each region in a CBM development area. Since the region illustrated in FIG. 14 is very wide, it can be understood that gas contents may be shown very different for each region. That is, core samples are obtained from drilling holes in the regions depicted as circles, triangles, and rectangles, and then a Langmuir experiment is performed. As a result, as illustrated in FIG. 15, even under the same pressure, the highest values of the amounts of gas adsorbed per unit of core samples are shown very different. That is, there are very large differences in coal contents.

As such, since the influence of the paleogeomorphic environment or the deposition environment on the CBM deposition phase is very large, even when the gas contents of a development area is analyzed, it is necessary to consider such a fact.

Thus, in the present invention, as illustrated in a first process of the flowchart in FIG. 3, firstly, a development target area was divided into a plurality of regions, and then, the above step was performed for each region to model the gas contents and gas productivity.

The criterion of dividing the region is as follows.

First, in this method, core samples are obtained from among the drilling holes, and the drilling holes at a short distance with respect the drilling holes in which proximate analyses have been performed are grouped. Since the target region is distributed widely, the deposition conditions may be different for each region. However, when a proximate analysis is performed for a drilling hole, the geological structure may be clearly determined, and when the distance from the drilling hole is short, it is more likely that a similar geological structure was formed.

The division of a region may be performed on the basis of a contour map. The region may be divided by grouping the drilling holes present on the same contour or present at a small distance from the relevant contour. It is because the drilling holes on the same contour are more likely to have similar deposition environment according to depths.

Finally, when the paleogeomorphic environment or the deposition environment has already been investigated, the drilling holes may be grouped on the basis of the identity of the deposition environment and the region may be divided.

Figure 16:
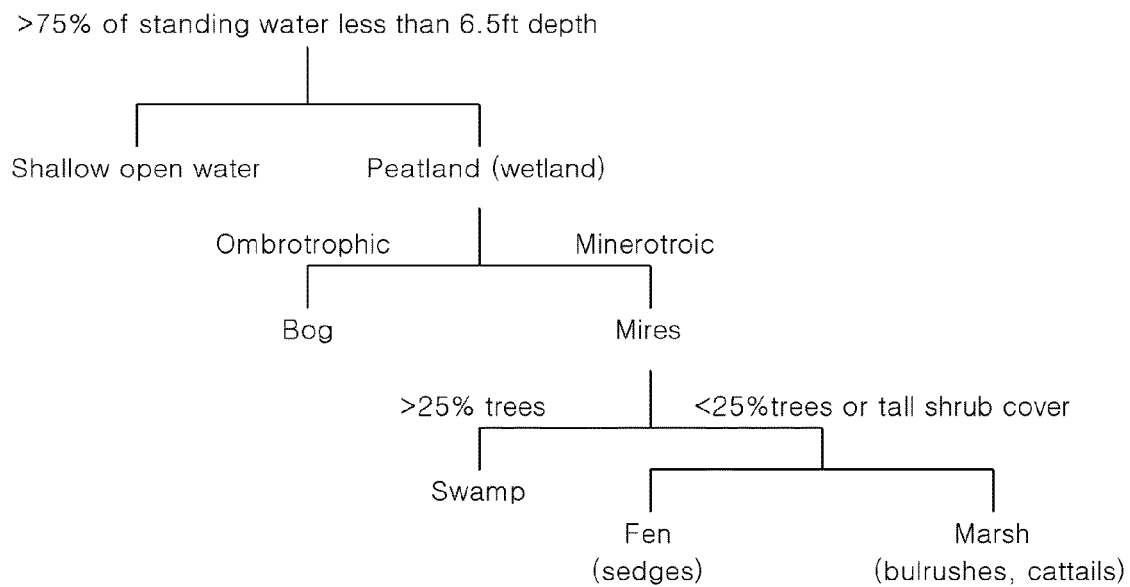
FIG. 16 is a diagram in which environments in which coal is deposited are classified.
Figure 17:
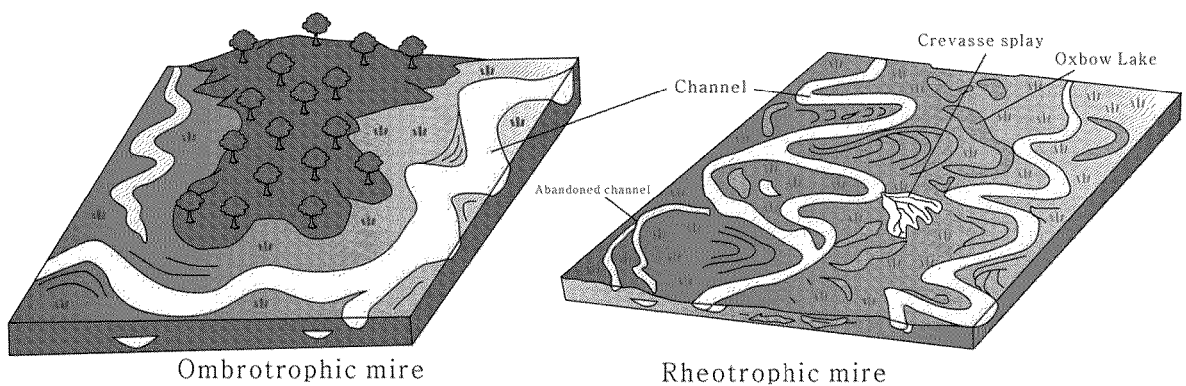
FIG. 17 illustrates models of an ombrotrophic mire environment, a rheotrophic mire or minerotrophic environment.
Figure 18:
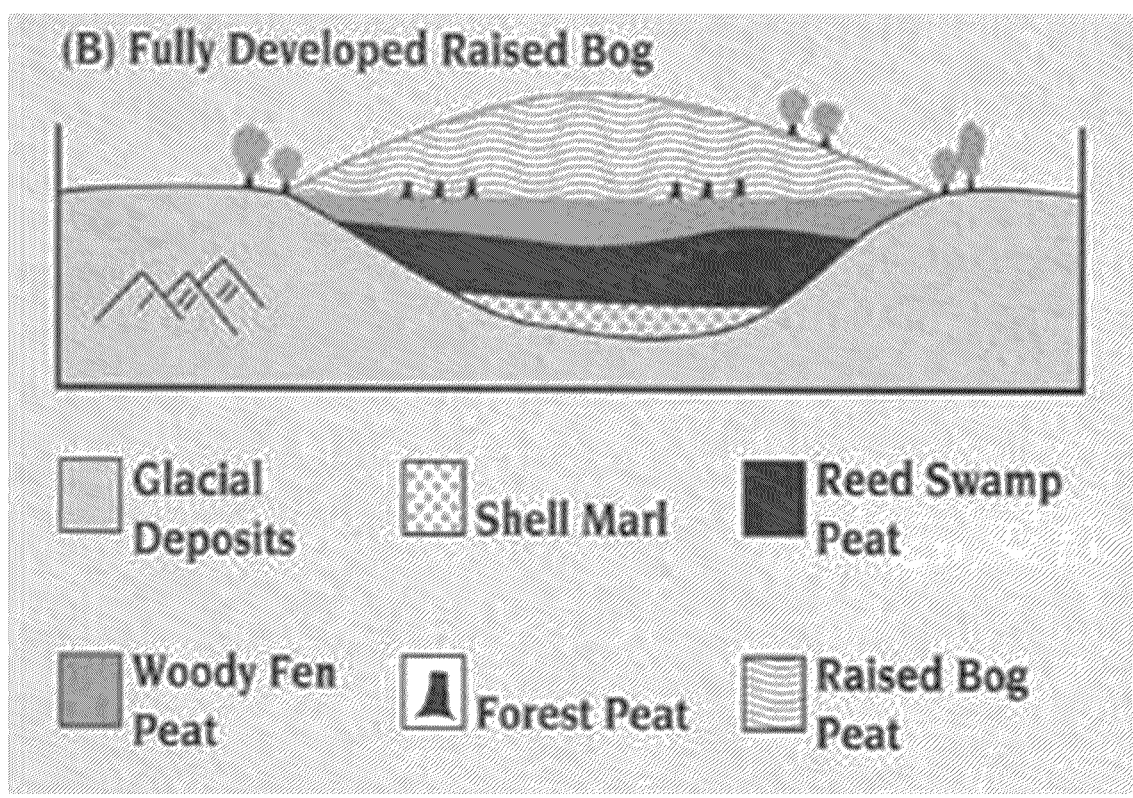
FIG. 18 illustrates a bog environment of ombrotrophic mire by cross-sections.
Figure 19:
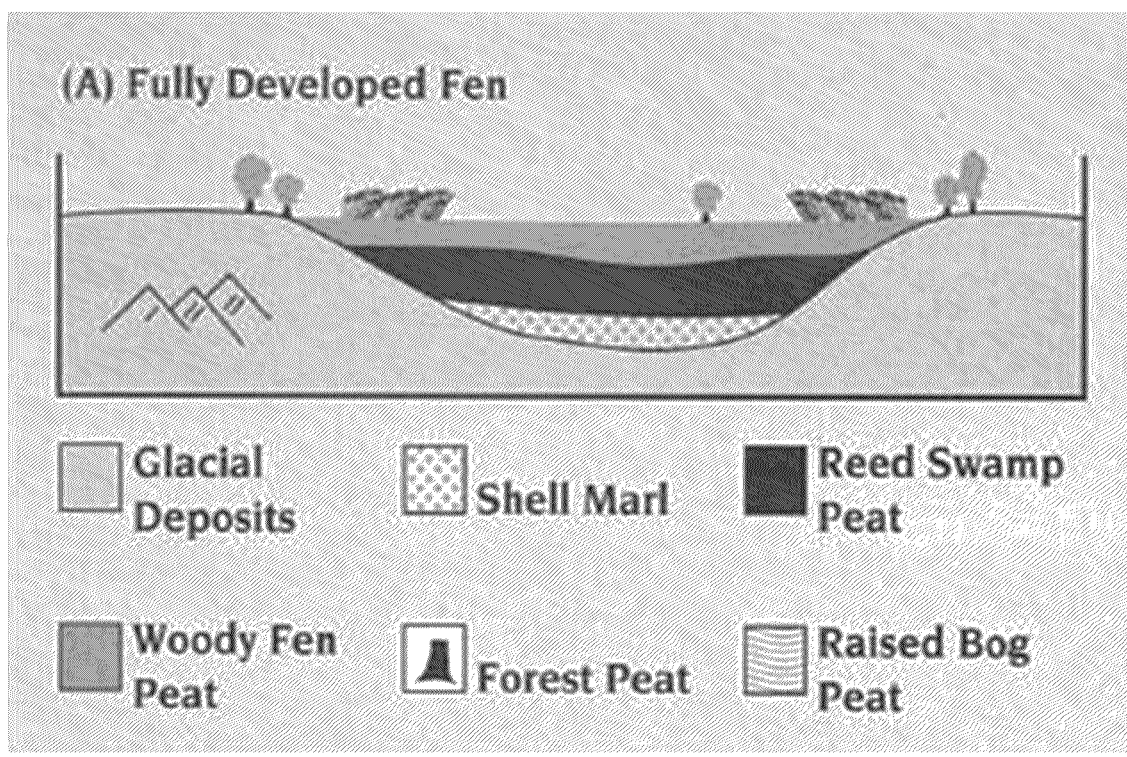
FIG. 19 illustrates a fen environment of rheotrophic mire by a cross-section.

FIG. 16 is a diagram in which environments in which coal is deposited are classified, and FIG. 17 illustrates an ombrotrophic mire environment, a rheotrophic mire or minerotrophic environment. In addition, FIG. 18 illustrates a bog environment of ombrotrophic mire by cross-sections, and FIG. 19 illustrates a fen environment of rheotrophic mire by a cross-section.

In the coal deposition environment illustrated in FIGS. 16 to 19, and when a preceding investigation has been performed regarding the presence of a channel as described above, it may be most reasonable that the regions of the development target area be divided on the basis of the deposition environments. When the region is divided according to the deposition environments of geological layers, actual deposition phases may be best reflected, and thus, the gas contents may be analyzed more reliably. In addition, although the three criterion mentioned above may be individually applied, these can be applied by being combined with each other.

As described so far, the present invention shows a more advanced modeling method in terms of several points compared to related arts.

First, the entirety of the region to be developed is not targeted as one target, but the region is divided according to the similarity of sedimentation environments, the similarity of contour maps, and the distant adjacency, thereby allowing the gas content and the production modeling to better reflect the reality.

Secondly, in related arts, since the gas contents of the cells in the entire grid were estimated through a statistical method with samples of proximate analysis data, moreover, samples of only the gas content for each depth, not only the preciseness but also the reliability thereof was degenerated. However, in the present invention, a trend function is derived through a proximate analysis data about densities, moisture contents, ash amounts, and gas contents, and the trend function is applied to all drilling points for which physical layer investigation was performed. Thus, the number of data used for a statistical method is remarkably increased unlike in related arts. Since the reliability of a statistical method is firstly dependent on the number of sample data, there is a merit in that data estimation can be very precisely performed compared to related arts. In addition, since the trend function is based on understanding of geology and resource engineering and multiphase analysis, there is a merit of well reflecting an actual trend.

Thirdly, in the present invention, while ash and water are individually determined, the amount of separated gas is determined by a newly proposed Langmuir function on the basis of the content of coal for each cell, the separation behavior of the actual gas may be precisely represented. These merits could be achieved by performing a proximate analysis of a plurality of core samples and deriving a Langmuir volume correction constant and a pressure correction constant which can be universally applied to these core samples. Through this, not only the production behavior of the gas, but also the initial disposition of production wells for economical production and the information about the operation of production wells over time may be provided, and thus, the economy and efficiency of gas production was increased.

The scope of the present invention is not limited by the examples and descriptions specifically described so far.

Furthermore, it is stated once more that the scope of the present invention should not be construed to be limited by an obvious change or a substitution in the field to which the present invention pertains.

The invention claimed is:

1. A modeling method for gas production in a coalbed methane (CBM) reservoir, comprising the steps of:
   (a) dividing a reservoir in a coalbed methane (CBM) development area into three-dimensional grids to form the three-dimensional grids having a plurality of cells;
   (b) forming at least one drilling hole in the development area and obtaining a sample for each depth in the reservoir;
   (c) modeling the amounts of ash, water, and gas for the plurality of cells in the three-dimensional grids;
   (d) modeling a pressure change over time in each of the cells in the grid under a premise in which a production well is formed in the grids;
   (e) performing a Langmuir experiment for a core sample obtained from step (b), calculating a Langmuir volume correction constant and a Langmuir pressure correction constant for a case in which ash and water are excluded and only coal is present in the core sample, determining a Langmuir function for a maximum amount of gas adsorption with pressure and amounts of ash and water as variables, and applying the Langmuir function to each of the cells in the grids to calculate an amount of gas detected due to pressure change in each cell over time,
   wherein modeling the amounts of ash, water, and gas for a cell of the plurality of cells in (c) comprises:
      deriving a first trend function representing a correlation between an ash content and a density using the sample obtained in step (b);
      deriving a second trend function representing a correlation between a moisture content and a depth using the sample obtained in step (b); and
      deriving a third trend function representing a correlation between a sum of the ash and moisture contents and a gas content using the sample obtained in step (b), and
   wherein the Langmuir function ($V_i$) for a maximum amount of gas adsorption is defined by the equation:

$$V_i = \frac{V_{L-daf} \times (1 - Ash - Moisture) \times P}{(P + P_{L-daf})}$$

wherein $V_{L-daf}$ is the Langmuir volume correction constant, Ash is the ash content of a cell, Moisture is the moisture content of the cell, P is the pressure of the cell, and $P_{L-daf}$ is the Langmuir pressure correction constant.

2. The modeling method of claim 1, wherein in the Langmuir experiment, measuring the maximum gas adsorption amount of the core sample depending on pressure, and calculating the corrected maximum gas adsorption amount ($V_{i-daf}$), which is the corrected value of the maximum adsorption amount ($V_i$) under a premise of a state (daf: dry ash free) in which water and ash are not present and the coal content is 100% in the core sample for each pressure in the core sample.

3. The modeling method of claim 2, wherein the Langmuir volume correction constant and the pressure correction constant are determined so that a plurality of Langmuir functions which are respectively represented as the corrected maximum gas adsorption amounts depending on pressure for the plurality of core samples, are set as a single Langmuir approximation function.

4. The modeling method of claim 3, wherein the single Langmuir approximation function is represented by the equation:

$$V_{i-daf} = V_{L-daf} - P_{L-daf}\left(\frac{V_{i-daf}}{P}\right)$$

wherein $V_{i-daf}$ represents the corrected maximum gas adsorption amount which has already been calculated in the Langmuir experiment, $V_{L-daf}$ represents the Langmuir volume correction constant, $P_{L-daf}$ represents the pressure correction constant, and P represents the pressure value in the Langmuir experiment, and
   wherein when an X-axis is the corrected maximum gas adsorption ($V_{i-daf}$/P) with respect to pressure, and a Y-axis is the corrected maximum gas adsorption amount ($V_{i-daf}$), the Langmuir volume correction constant (Vi-daf) and the pressure correction constant ($P_{L-daf}$) are determined so that a linear functional equation below for the corrected maximum gas adsorption amount ($V_{i-daf}$) best approximates a plurality of points on an X-Y plane measured and calculated in the Langmuir experiment.

5. The modeling method of claim 1, wherein the steps (a)-(e) are performed by dividing the development area into a plurality of regions in a planar direction, and grouping the drilling wells for each of the regions.

6. The modeling method of claim 5, wherein the division of the development area is performed on the basis of a distance adjacent to the drilling well at which the core sample is obtained.

7. The modeling method of claim 5, wherein the division of the development area is performed on the basis of a height on a contour in a topographic map.

8. The modeling method of claim 5, wherein after an investigation is performed in advance on a deposition environment of a topographic layer in the development area, division of the development area is performed on the basis of identity of the deposition environment.

9. The modeling method of claim 8, wherein the deposition environment comprises a region in which a channel was present, an ombrotrophic mire, and a rheotropic mire.

10. The modeling method of claim 1, wherein a gas saturation degree of the cell is calculated by calculating a ratio of the maximum gas adsorption amount to the gas content for each cell.

* * * * *